United States Patent [19]
Phillips

[11] 4,113,247
[45] Sep. 12, 1978

[54] EDGE VACUUM GUIDE FOR FLEXIBLE MEMBERS

[75] Inventor: Edwin R. Phillips, Rosemont, Pa.

[73] Assignee: Sperry Rand Corporation, New York, N.Y.

[21] Appl. No.: 486,245

[22] Filed: Jul. 5, 1974

Related U.S. Application Data

[63] Continuation of Ser. No. 317,815, Dec. 22, 1972, abandoned.

[51] Int. Cl.² .............................................. B65H 5/22; B65H 5/38
[52] U.S. Cl. .................................... 271/264; 193/38; 226/7; 271/194; 271/250; 302/2 R
[58] Field of Search ................ 271/264, 194, 195, 240, 271/250, 248; 302/29, 31, 2 R; 193/38, 41, 1, 2; 226/97, 7

[56] References Cited

U.S. PATENT DOCUMENTS

| | | | |
|---|---|---|---|
| 3,192,845 | 7/1965 | Schmidt | 226/97 X |
| 3,398,913 | 8/1968 | Orlando | 226/97 X |

Primary Examiner—Bruce H. Stoner, Jr.
Attorney, Agent, or Firm—Rene A. Kuypers

[57] ABSTRACT

The invention described is a guide for directing a moving flexible member along a prescribed path. Suction slots are provided along the lateral walls of the guide for enabling the member to be directed along the desired path.

2 Claims, 3 Drawing Figures

EDGE VACUUM GUIDE FOR FLEXIBLE MEMBERS

This is a continuation of application Ser. No. 317,815, filed Dec. 22, 1972, now abandoned.

BACKGROUND OF THE INVENTION

1. Field of the Invention

The invention is directed to a transport device using edge guiding for moving a flexible member along a certain route.

2. Description of the Prior Art

An arrangement for guiding a flexible record member along a prescribed path in a transport device using known principles was found to be unsatisfactory since it was accompanied by wear. This technique comprised the use of vacuum ports in the plane of the transport track accompanied by an air bearing along the track and surrounding the ports. The wear factor in the above arrangement was caused by the deflection of the record in the vincinity of the ports due to vacuum action. In addition to the above-mentioned wear problem, the technique of developing both a vacuum and an air bearing in the same track was difficult to achieve.

Another shortcoming of the above-described technique resulted from the fact that the member in traversing the track adversely affected the impedance as seen by the vacuum source. Thus, as the member aproached the vacuum ports the impedance increased causing the vacuum to increase and the card moved closer until the member finally contacted the hole. When this occurred energy was removed from the member and wear of the card surface resulted

SUMMARY OF THE INVENTION

The invention discloses a transport device for stable lateral positioning of a flexible member that removes the possibility of wear on its surfaces. Vacuum edge guiding is utilized in the transport to achieve lateral positioning and to reduce the wear factor only at the member's edge. The member moves along a prescribed path in the transport by locating vacuum ports along the side plates of the transport. When the member bisects the port holes as it follows the prescribed path it is in its balanced or symmetrical position. If the edge attempts to move away from the position of symmetry in its travel, the vacuum forces on one side of the member substantially increases to cause the edge to again bisect the ports.

DESCRIPTION OF THE PREFERRED EMBODIMENT

Figure 1:
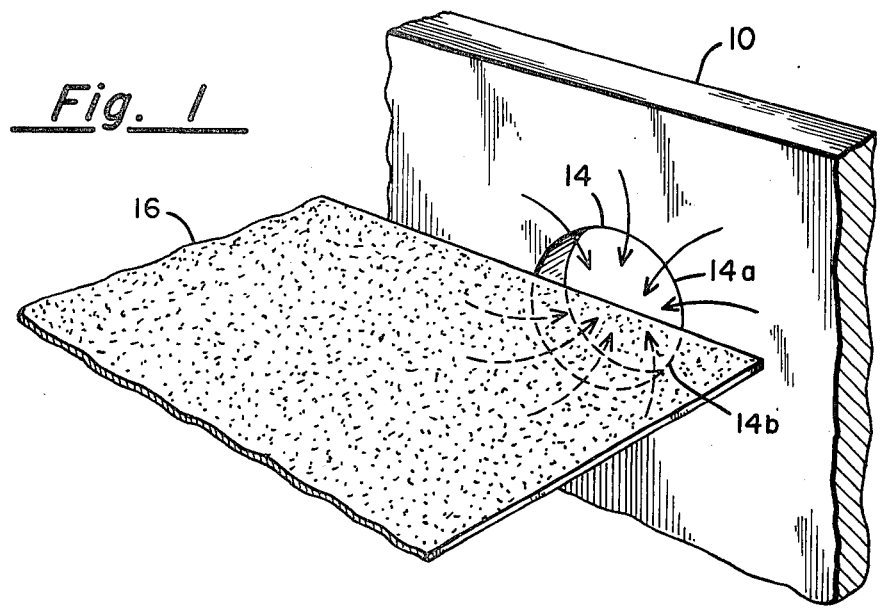
FIG. 1 depicts the basic configuration of the invention.

Referring now to FIG. 1 of the drawings, the flexible member 16 is shown in its symmetrical position bisecting the port 14. The port 14 formed in the side plate 10 is connected to a vacuum chamber (not shown). In the position of symmetry shown with respect to the port 14, the vacuum applies equal forces upon the top of member 16 via the upper port section 14a and upon its bottom via the lower port section 14b thereby creating an equilibrium condition.

Figure 2:
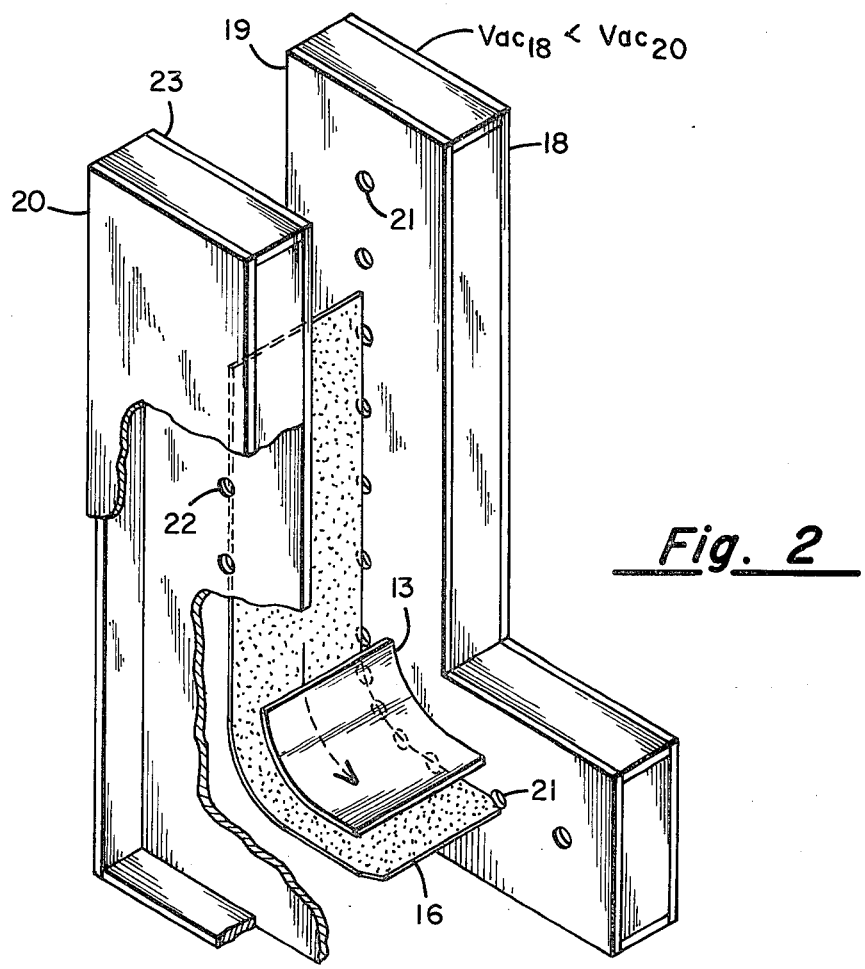
FIG. 2 exemplifies a flexible member following a prescribed path by utilizing vacuum edge guiding.

Referring now to FIG. 2 there is depicted the invention in its simplest mode of operation. Two side plates 19 and 23 separated by approximately the width of the member 16 are provided to form edge guides. A plurality of ports 21 and 22 are respectively located in the edge guides 19 and 23 and are connected into the respective suction manifolds 18 and 20. The ports 21 and 22 are formed in the edge guides 19 and 23 in a manner such as to provide a prescribed path for the member 16.

In operation, it has been found that the suction ports 21 and 22 exert forces on the member 16 tending to bring the latter into their plane of symmetry. It has also been observed that when the member 16 tends to move away from its symmetrical position, a restoring force is automatically provided to return it to its equilibrium position. This restoring force increases with distance away from the slot centerline so long as the member 16 is within the port width. This results from the following reasons.

Ambient air is sucked into the suction manifold 18 and 20 through their respective holes 21 and 22 thus generating a flow field around the member 16 being guided in the manner shown in FIG. 1. When the member 16 is symmetrical or bisects the port as shown in FIG. 1, the flow field above the member is exactly equal to the flow field below it assuming that the member 16 has no weight. Under this condition the velocity of the air which is pulled into manifolds 18 and 20 above and below the member 16 is the same because the amount of opening above and below the member 16 is equal. Accordingly, if the velocity of the air flow above and below the member 16 is equal, the pressures above and below the member 16 is equal, the pressures above and below will be equalized and the member will be in an equilibrium position in accordance with Bernoulli's principles.

Let us now assume that the member 16 in traversing the curve portion of the prescribed track in FIG. 2 moves away from the symmetrical position in a downward direction due to centrifugal force but nevertheless within the slot width. In this situation, the port opening 14a above the member 16 will be greater than the port opening 14b below the member. Hence, the velocity of the ambient air sucked into the manifolds 18 and 20 through the upper opening 14a will be greater than the velocity of air sucked through the lower opening 14b because the upper opening is larger than the lower opening. Therefore, the pressure above the member 16 will be less than that below. The card will be displaced from the position of symmetry until the centrifugal force is balanced by the net vacuum restoring force.

In like manner, if the member 16 is above the symmetrical position the velocity of the ambient air below the member is greater than that above it. Accordingly, a pressure differential is created which causes the member 16 to automatically lower itself to again bisect the ports. It is therefore seen that the flexible member 16 follows the prescribed path arranged along the edge guides 19 and 23 because of the restoring forces provided by the vacuum porting.

It should be noted hereat that since only the edges of the member 16 may come into contact with the slots 21 and 22, the impedance seen by the vacuum source remains essentially constant. This is to be contrasted with the arrangement wherein the vacuum slots are located in the plane of the card as above discussed. In this latter case, as the card approaches the hole the impedance increases causing the vacuum to increase and the card moves closer until the member contacts the hole.

It has been found in the instant invention that the restoring force increases with distance away from the center line so long as the card edge is within the slot or hole width and decreases with distance away from the center line if the card edge has moved past the slot.

It should be noted that the operation of the edge-guided transport above described does not require a track (i.e., a flat surface in the same plane as the document 16). However, if the member 16 has been propelled very rapidly by an accelerator (not shown) and it is required to follow a curved route, sometimes the g forces cause the member 16 to move in a direction beyond the effective range of the ports such that proper guidance of the member 16 is not possible. In such a situation, an effective expedient is to provide a covering 13 in close proximity of the holes where the curvature in the prescribed path occurs. The covering 13 restricts the volume of air in the vicinity above the curved portion of the prescribed path. This restriction enables the vacuum chambers 18 and 20 to exert a greater force upon the upper portion of the member 16 via the suction holes 21 and 22. Accordingly, the member 16 will not fall below the effective range of the suction holes and the member 16 will follow the prescribed path, (without contacting the covering 13).

It should be understood however by those skilled in the art that where the speed of the member 16 is not too rapid, the cover 13 is not necessary and the member 16 will follow the prescribed path by using edge guiding alone.

The invention as described in FIG. 2 may be utilized for precise locating of the member 16 for reference purposes against one of the edges 19 or 20. Thus, it is often necessary to locate the member's edge within one mil of a reference edge. This may be accomplished by biasing the member 16, for example, against one of the edges such as edge 20 which becomes the reference edge. This is accomplished in the instant invention by using asymmetrical vacuum edge guiding. Asymmetrical edge guiding is produced by utilizing a stronger vacuum in the manifold 20 than in the manifold 18. This is demonstrated, for example, by the vacuum in manifold 18 being less than the vacuum in chamber 20 (i.e., $Vac_{18} < Vac_{20}$). The member 16 will be therefore attracted to the edge with the strongest vacuum force or to the edge 23 comprising one of the sides of manifold 20.

Figure 3:
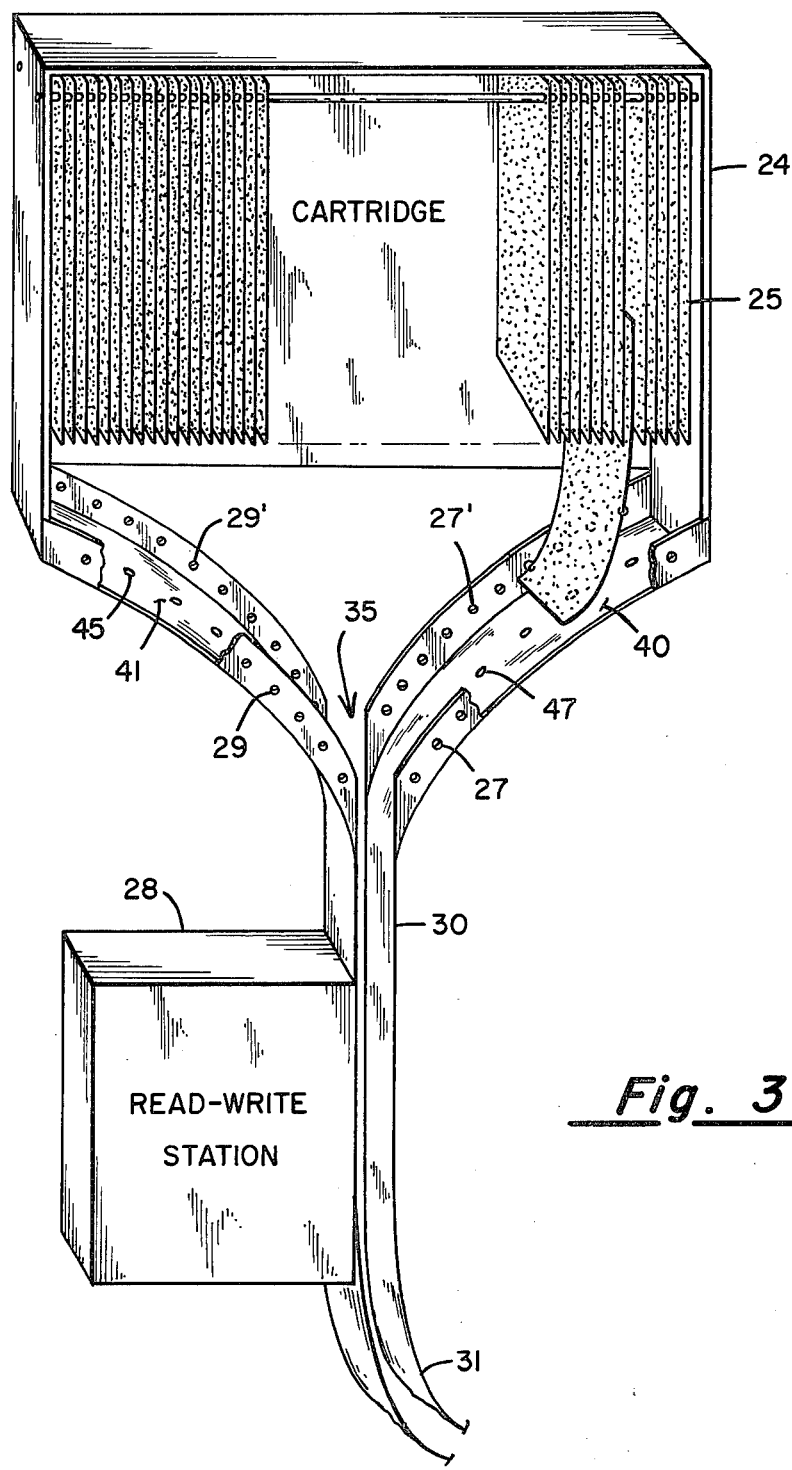
FIG. 3 shows the invention being utilized in a preferred embodiment.

Referring now to FIG. 3, the invention is shown being utilized in a preferred embodiment. The embodiment shown comprises a portion of a device called an archival memory. This memory type is designed to provide large memory capacity on the order of $10^{10}$ bits of information. The portion of the archival memory shown comprises a memory cartridge 24 which stores a plurality of storage documents 25. The documents 25 comprises an iron oxide flexible Mylar sheet which is 5 mils thick and is used for magnetic recording purposes. The document size is 5.2 inches wide by 21 inches long. Each document 25 may store $10^7$ bits of binary information. The capacity of the cartridge 24 is 1,023 cards so that the total information capacity of the archival memory is $10^{10}$ bits.

Associated with each cartridge 24 is a read-write station 28. This device forms no part of the instant invention and is disclosed in the co-pending patent application, U.S. Pat. No. 3,855,621, issued Dec. 17, 1974.

The read-write station 28 comprises a drum device which receives a document 25 that has been transported to it so that information may be read from or recorded thereon. The desired document 25 in the cartridge is selected by suitable means and falls into the Y-shaped drop turn and becomes attached to the drum in the read-write station 28. When the flexible document 25 is expelled from the cartrdige 24 it is given an instant acceleration by suitable means (not shown) and reaches a speed of 130 inches/second.

The Y-shaped drop turn incorporates the principles disclosed in the instant invention. However, in view of the high speed of the document as it is propelled through the transport, respective tracks 40 and 41 are provided. The tracks 40 and 41 provide a restricted plenum where the document 25 is expelled from the cartridge 24 and is positioned in the transport. Therefore, the vacuum is able to keep the document 25, despite its high speed, within the influence of the suction holes 27-27' and 29-29'. Bernoulli jets 45, 47 which are angled at 30 degrees toward the chute 35, are located in the tracks in order to cushion the document 25 so as it is expelled from the cartridge 24 and to aid in moving it in a forward direction. It can be readily appreciated therefore that the 21" long document 25 is guided into the narrow chute of the drop turn via the vacuum edge guiding without hitting the opposite track. It is obvious that if the flexible document 25 were to hit the opposite track of the drop-turn, a jam-up would occur and operation would be stopped.

Accordingly, as a document 25 is dropped from the cartridge 24, it will fall into the left or right track of the Y-shaped drop-turn. As soon as the document edges come into proximity with either the holes 29-29' or 27-27', the document aligns itself in the manner previously described and follows the prescribed path into the chute 35.

Although the instant invention has been described with respect to a relatively wide flexible member, it should be apparent to the practitioner in the art that as the width of the member decreases the greater will be the influence of the suction ports for edge guiding purposes. The invention therefore readily suggests itself to edge guiding of magnetic tape, wire or the like. An application of the invention that readily suggests itself is a self-threading tape or film device wherein the tape or film must follow a circuitous route before it becomes operative.

What is claimed is:

1. A system for transferring a flexible member in a path between locations comprising:
    (a.) a two-sided, flat guide means only wherein said member traverses said path perpendicular to each side thereof, said path being substantially linear;
    (b) a two-sided, flat extension connected to said guide means such that said path changes direction by approximately 90°;
    (c) symmetrical ports connected to a vacuum means located in each side of said two-sided guide means and extension, said ports being located in the first side in a facing relationship with the ports located in the second side of said guide means;
    (d) means located in the vicinity of said 90° turn, said means restricting the flow of air into said ports by said vacuum means.

2. The method of moving a flexible member between locations along a flat-sided guide means comprising the steps of, (a.) locating a plurality of circular and unobstructed ports in the sides of said guide means such that said ports are arranged in a substantially linear path and are facing one another, each said port having an axis of symmetry in the direction of said prescribed path;

(b.) positioning said moving member at the entrance to said plurality of ports and along their axes of symmetry, (c.) applying a negative pressure to said ports to generate equivalent forces upon the upper and under sides of said member to maintain said moving member along said axes of symmetry, whereby when said moving member is not in equilibrium in traversing said guide means said vacuum means produces non-equivalent forces which restore said member to the axes of symmetry;

(d.) applying a negative pressure of one value to the ports of one side of said guide means and applying a negative pressure of a different value to the ports of the second side of said guide means.

* * * * *